United States Patent
Kim et al.

(10) Patent No.: US 7,302,814 B2
(45) Date of Patent: Dec. 4, 2007

(54) APPARATUS FOR PREVENTING DEFLECTION OF SUBSTRATE TUBE

(75) Inventors: Chul Min Kim, Kyeonggi-do (KR);
Weon Bae Kim, Kyeonggi-do (KR);
Sang Joon Bae, Kyeonggi-do (KR);
Won Ki Park, Kyeonggi-do (KR)

(73) Assignee: LG Cable Ltd, Seoul (KR)

( * ) Notice: Subject to any disclaimer, the term of this patent is extended or adjusted under 35 U.S.C. 154(b) by 215 days.

(21) Appl. No.: 10/494,625

(22) PCT Filed: Mar. 24, 2003

(86) PCT No.: PCT/KR03/00579
§ 371 (c)(1),
(2), (4) Date: May 4, 2004

(87) PCT Pub. No.: WO2004/009501
PCT Pub. Date: Jan. 29, 2004

(65) Prior Publication Data
US 2005/0016216 A1 Jan. 27, 2005

(30) Foreign Application Priority Data
Jul. 20, 2002 (KR) ............ 10-2002-0042773

(51) Int. Cl.
*C03B 37/07* (2006.01)
(52) U.S. Cl. .................... 65/384; 65/417
(58) Field of Classification Search ............ 65/384, 65/417, 109, 271, 296, 292, 108; 425/392
See application file for complete search history.

(56) References Cited

U.S. PATENT DOCUMENTS

| | | | | |
|---|---|---|---|---|
| 4,636,239 A * | 1/1987 | Wilson et al. | ............ | 65/109 |
| 4,714,488 A * | 12/1987 | Powers | ............ | 65/491 |
| 5,118,333 A * | 6/1992 | Baltzer et al. | ............ | 65/423 |
| 5,192,350 A * | 3/1993 | Le Sergent | ............ | 65/382 |
| 5,761,366 A * | 6/1998 | Oh et al. | ............ | 385/127 |
| 6,220,060 B1 | 4/2001 | Wisk et al. | ............ | 65/435 |
| 6,314,765 B1 * | 11/2001 | Charlton et al. | ............ | 65/382 |
| 6,536,239 B1 * | 3/2003 | Mueller et al. | ............ | 65/292 |
| 6,557,379 B1 * | 5/2003 | Nagasawa et al. | ............ | 65/29.12 |
| 6,978,641 B2 * | 12/2005 | Sugiyama et al. | ............ | 65/105 |

FOREIGN PATENT DOCUMENTS

| | | |
|---|---|---|
| KR | 2001-0086347 | 9/2001 |
| KR | 2001-0086668 | 9/2001 |

* cited by examiner

*Primary Examiner*—Steven P. Griffin
*Assistant Examiner*—Queenie Dehghan
(74) *Attorney, Agent, or Firm*—Vidas, Arrett & Steinkraus (57) ABSTRACT

An apparatus for producing an optical fiber preform to perform the deposition process by modified chemical vapor deposition. The Apparatus comprises a main heat source location sensor (800) for detecting the location of a main heat source for heating a substrate tube 100, an additional supporting device control part (1000) wiredly or wirelessly connected to the main heat source location sensor (800), and an additional supporting device (1100) wiredly or wirelessly connected to the additional supporting device control part (1000) for supporting the substrate tube (100). The present invention reduces the effective length of the substrate tube (100) by additionally supporting the substrate tube (100), thereby minimizing the deflection of the substrate tube (100). Particularly, it is possible to considerably reduce the deflection of the substrate tube at its initial part and thus to achieve a high deposition efficiency. Accordingly, it is possible to mass-produce an optical fiber preform of high quality.

4 Claims, 7 Drawing Sheets

FIG. 5 understand# APPARATUS FOR PREVENTING DEFLECTION OF SUBSTRATE TUBE

TECHNICAL FIELD

The present invention relates to a method for producing an optical fiber preform by modified chemical vapor deposition (MCVD), and more particularly to an apparatus for producing an optical fiber preform with a minimized deflection of a substrate tube (quartz) and a method for producing an optical fiber preform using the same.

BACKGROUND ART

In general, the optical fiber preform is produced by modified chemical vapor deposition (MCVD), outside vapor deposition (OVD) or vapor axial deposition (VAD) in which the preform is directly grown on the tip of a quartz bar.

The MCVD, the most widely used one of these methods, forms an optical fiber preform by depositing a core layer and a clad layer having different refractive indices in a quartz tube of a high purity. Here, the refractive indices are controlled by adjusting composition rates of deposited substances. That is, the refractive indices of the core and clad layers are controlled by differently adjusting the deposition rate of $GeO_2$ to $SiO_2$ in the composition used for the deposition of the core and clad layers.

The composition is usually supplied into the quartz tube by carrier gases and deposited while the outer surface of the quartz tube is heated to a temperature between 1300 to 1700° C. by a heat source such as gas torch. The gaseous reactant becomes the soot of $SiO_2$ and $GeO_2$ at such a high temperature.

While the soot of $SiO_2$ and $GeO_2$ passes through the quartz tube in the axial direction of the tube, a part of the soot is deposited on the wall of the quartz tube by thermophoresis and the rest thereof is discharged to the outside through a soot exhaust tube. The quartz tube with the sooty substance deposited on the wall is subjected to a collapsing process to produce a preform rod in the form of a cylinder and then a closing process to complete the entire process, thereby producing an optical fiber preform. Here, the quartz tube which is used to form optical fiber preform is called a substrate tube.

In recent years, there is a trend toward increased used of a horizontal lathe in the deposition process. A primary preform prepared in the deposition process using the horizontal lathe is subjected to the collapsing process and the closing process to form an optical fiber preform.

Figure 1:
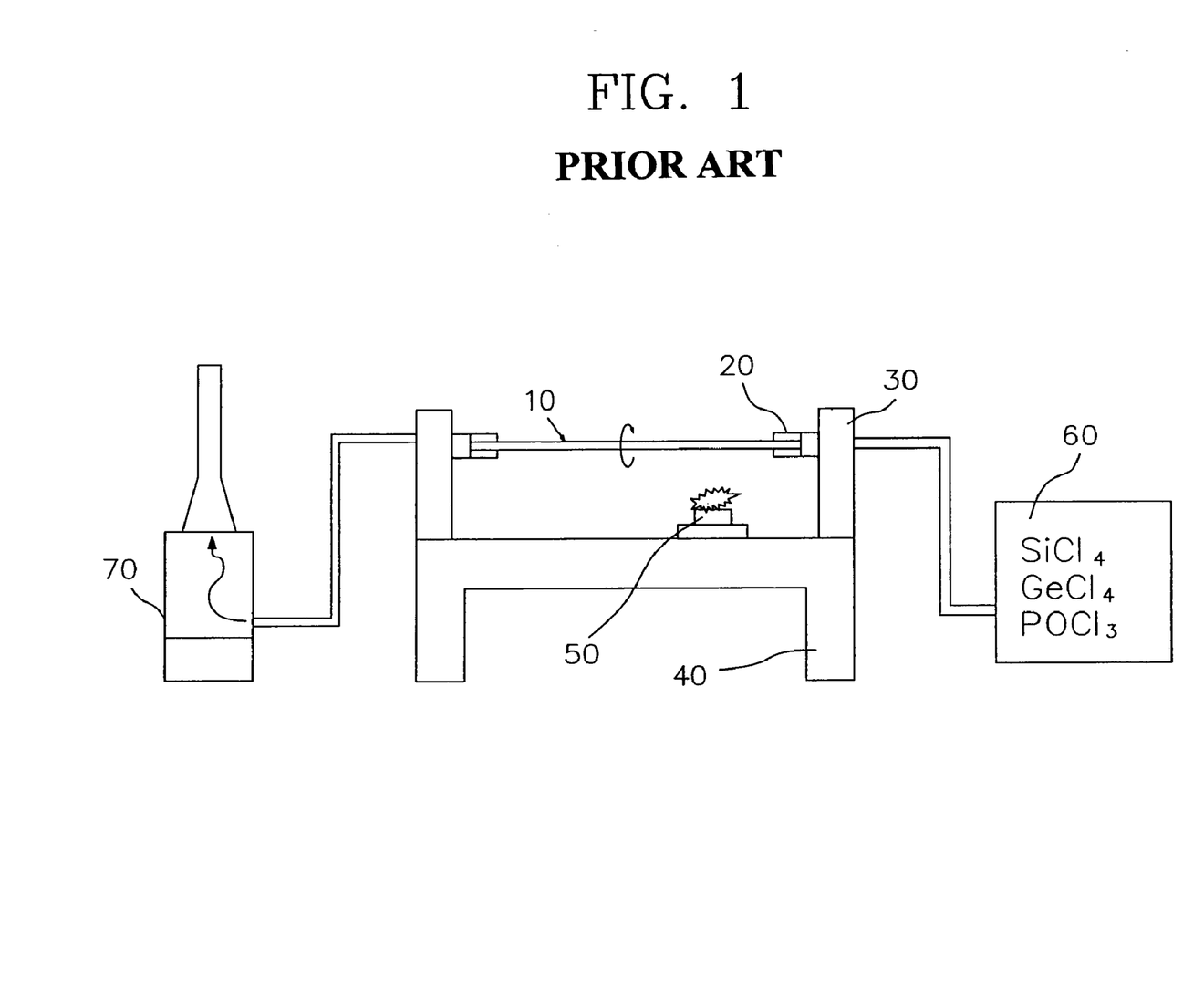
FIG. 1 is a schematic view of a conventional apparatus for producing an optical fiber preform.

FIG. 1 is a schematic view of a conventional apparatus for producing an optical fiber preform in which deposition process according to the modified chemical vapor deposition method is performed.

As shown in FIG. 1, the conventional apparatus for producing an optical fiber preform includes a substrate tube 10, chucks 20 for holding hot ends of the substrate tube 10, supporting portions 30 for supporting respective chucks, a horizontal lathe 40 on which the support portions 30 are fixedly mounted, a main heat source 50 disposed on the horizontal lathe 40 between the supporting parts for beating substrate tube 10, a gas supply device 60 disposed outside the horizontal lathe for supplying gases to one end of the substrate tube 10, and a soot collector 70 disposed outside the horizontal lathe for collecting soot discharged Through a soot exhaust tube connected to the other end of the substrate tube.

Since the methods for producing an optical fiber preform by the conventional apparatus for producing an optical fiber preform having the above construction involve a high temperature deposition process, the mechanical strength and viscosity of the substrate tube 10 are reduced. Thus, in the process for producing a preform, the deposition should be carried out at a uniform rate and the outside diameter of the substrate tube 10 should be kept uniform while minimizing the deformation of the substrate tube 10 in the radial direction. However, the optical fiber preform produced by the conventional methods has elastic deformation and viscous deformation at the same time. That is, the finally produced substrate tube 10 deflects in proportion to the elastic deformation level, deposition time and viscous deformation level.

Figure 2:
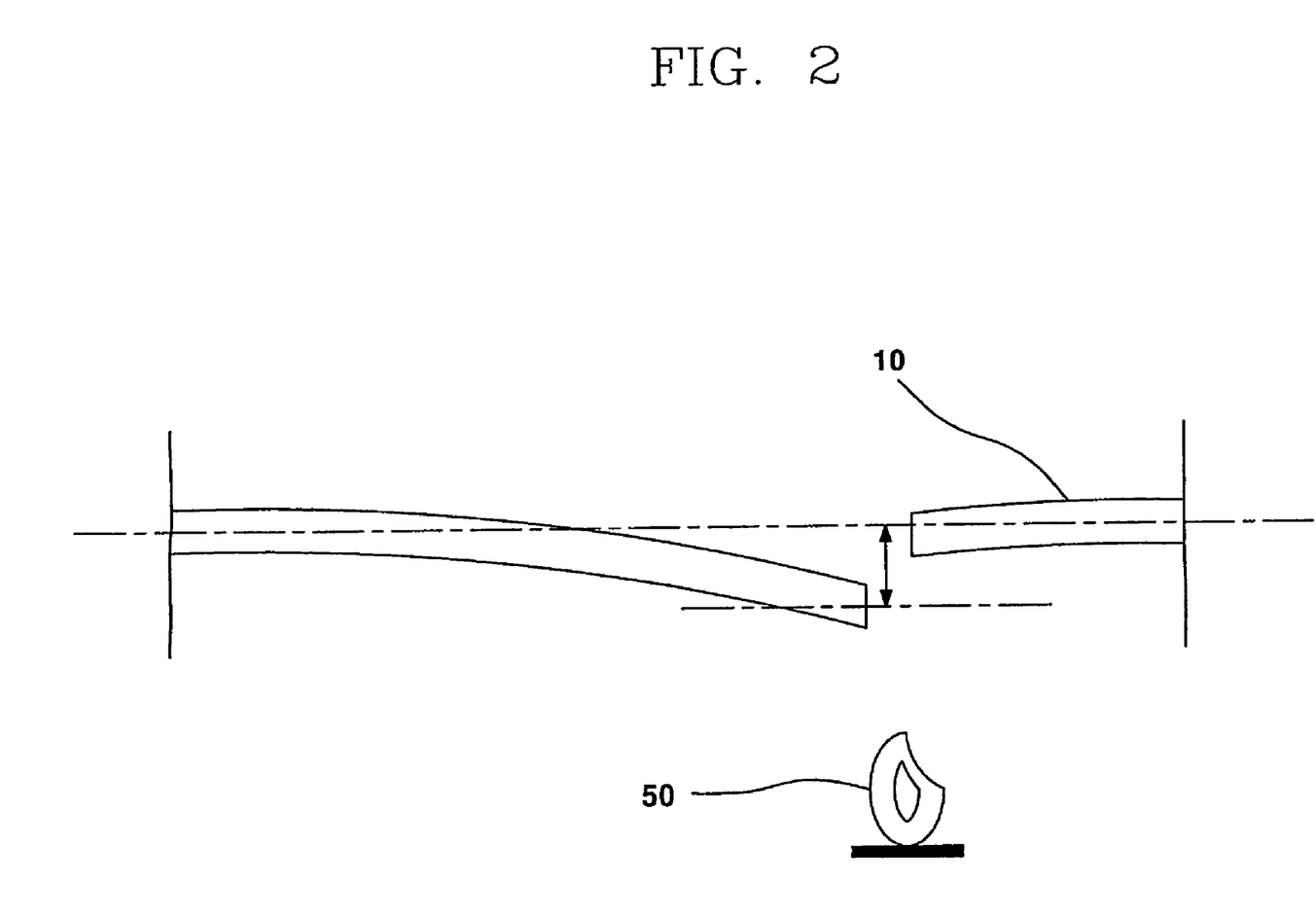
FIG. 2 is a schematic view showing the deflection phenomenon of a substrate tube produced by the conventional apparatus for producing an optical fiber preform.

FIG. 2 is a schematic view showing the deflection phenomenon of the substrate tube 10 produced by the conventional apparatus for producing an optical fiber preform, wherein the substrate tube deflects more when the deposition process is carried out repeatedly.

Moreover, the substrate tube and the deposition time should be longer with a higher temperature for mass production, and it makes deflection phenomenon of the substrate tube 10 to be severer. Thus, when the deflection of the substrate tube 10 is excessive, the production of an optical fiber preform itself is impossible, or the produced optical fiber preform, where it may be produced, cannot properly shows its function.

DISCLOSURE OF INVENTION

Thus, the present invention has been made in view of the above problems, and it is an object of the present invention to provide an apparatus for producing an optical fiber preform with an additional support for a substrate tube 100 which has been heated by a main heat source 500 for a predetermined period of time to prevent the substrate tube 100 from deflecting in the deposition process of modified chemical vapor deposition and a method for producing an optical fiber preform using the same.

In order to achieve the above object, according to one aspect of the present invention, there is provided an apparatus for producing an optical fiber preform to perform the deposition process by modified chemical vapor deposition comprising a main heat source location detecting sensor 800, an additional supporting device control part 1000 electrically connected to the main heat source location detecting sensor 800 by wired or wireless means and an additional supporting device 1100 electrically connected to the additional supporting device control part 1000 by wired or wireless means.

An apparatus for producing an optical fiber preform using MCVD (Modified Chemical Vapor Deposition) that deposits deposition compositions on an inner surface of a substrate tube by heating an outer surface of the substrate tube supported by a horizontal lathe with the use of a main heat source moving along the horizontal lathe, the apparatus comprising an additional supporting device including a substrate tube additionally supporting part for supporting the substrate tube in a load direction in contact with the substrate tube, a vertical transport member for transporting the substrate tube additionally supporting part perpendicularly to an axial direction of the substrate tube additionally supporting part, and a horizontal transport member for transporting the vertical transport member to the axial direction; a main heat source location detecting sensor for detecting a location of the main heat source; a supporting location control sensor for detecting a location of the additional supporting device when the additional supporting device reaches a predetermined supporting location; and an additional supporting device control part for receiving a signal indicative of the location of the main heat source from the main heat source location detecting sensor and then moving the additional supporting device using the transport member, the additional supporting device control part controlling the vertical transport member to raise the substrate tube additionally supporting part perpendicularly to the axial direction and thus support the substrate tube.

In order to achieve the above object, according to another aspect of the present invention, there is also provided a method for producing an optical fiber preform to perform the deposition process of modified chemical vapor deposition, comprising the steps of: heating a substrate tube 100 from initial part to the ending part by a main heat source 500 (S1); identifying the location of the main heat source 500 by a main heat source location detecting source 800 (S2); moving a additional supporting device 1100 to a predetermined location (S3 and S4); supporting the substrate tube 100 until the temperature of substrate tube reaches the target value after the main heat source 500 starts heating the substrate tube (S5); and returning the additional supporting device 1100 to its original location (S6).

BRIEF DESCRIPTION OF THE DRAWINGS

The above and other objects, features and advantages of the present invention will be apparent from the following detailed description of the preferred embodiments of the invention in conjunction with the accompanying drawing, in which.

BEST MODE FOR CARRYING OUT THE INVENTION

Now, the present invention is described in detail.

Figure 3:
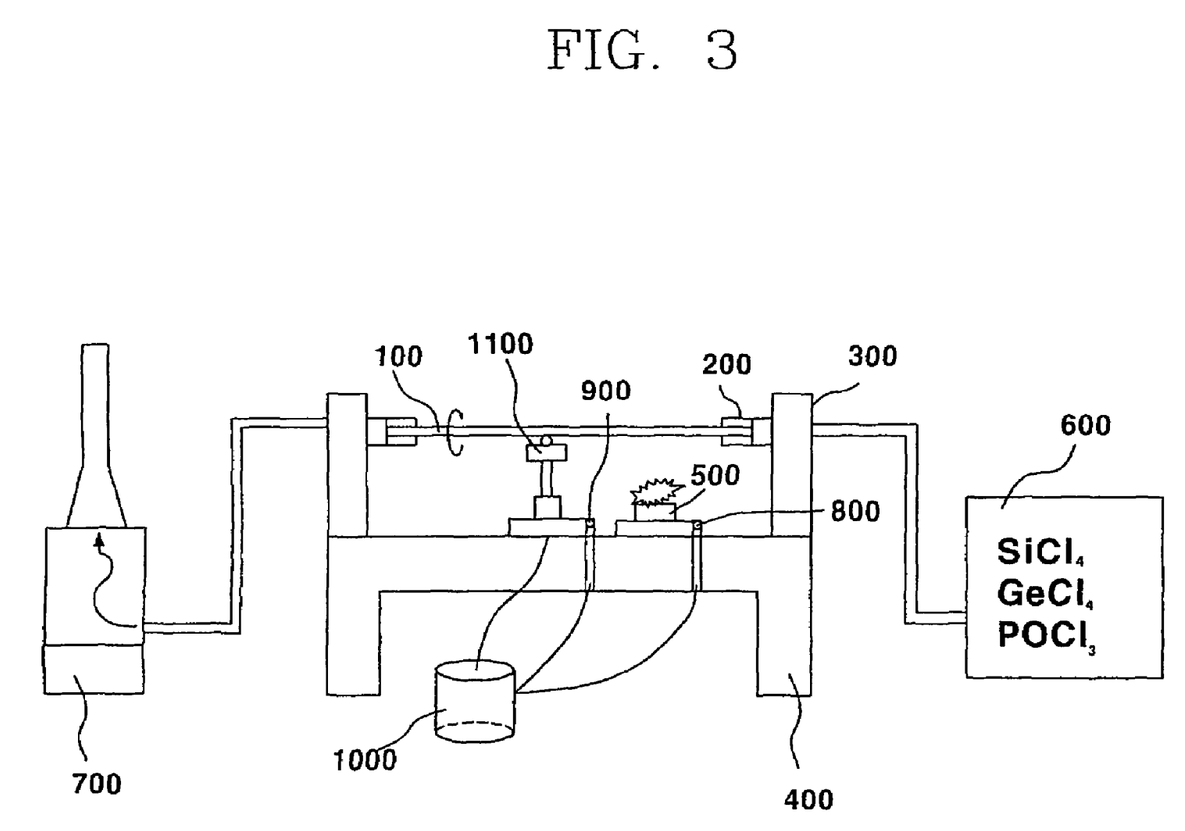
FIG. 3 is a schematic view of an apparatus for producing an optical fiber preform according to an embodiment of the present invention.
Figure 4:
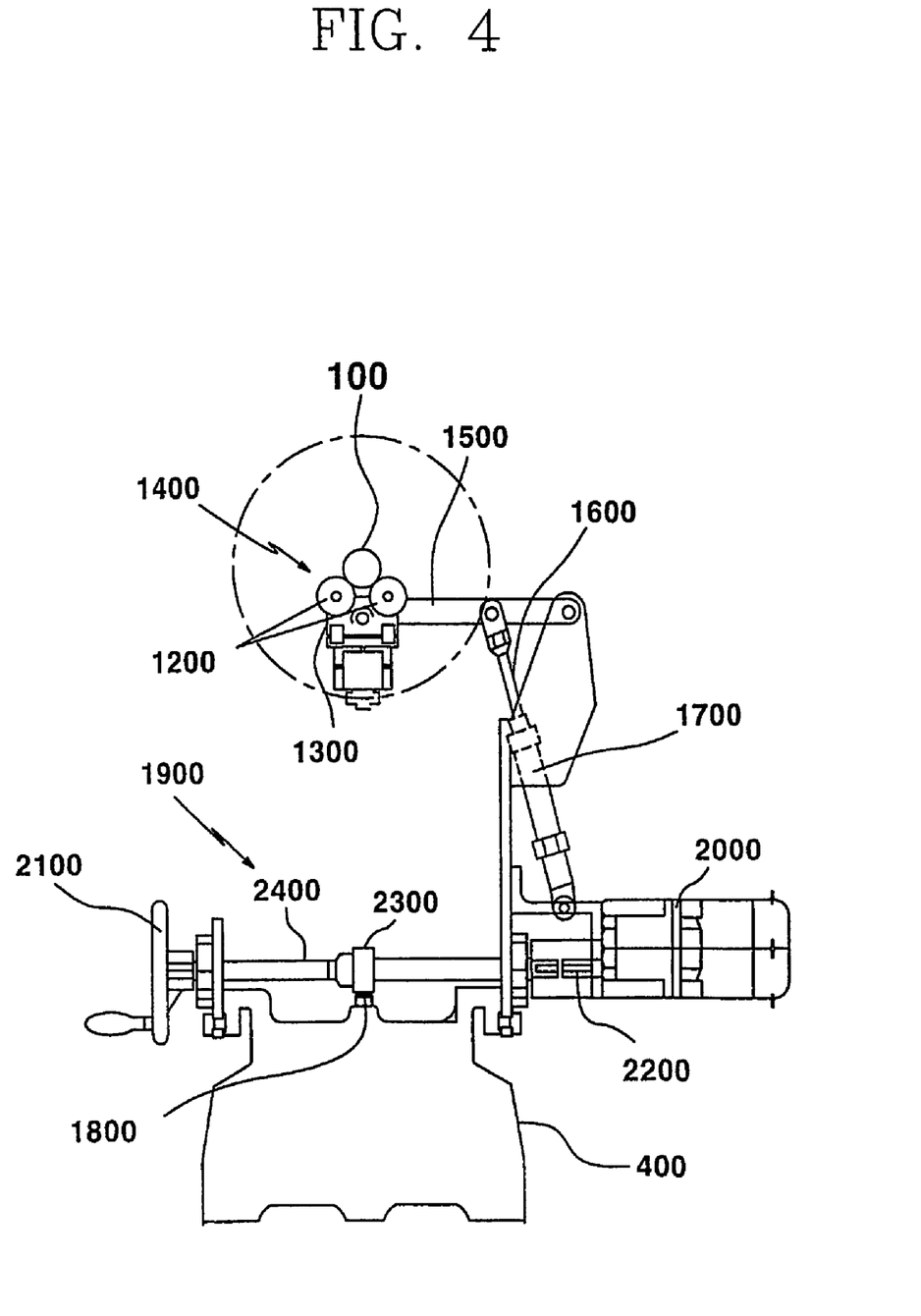
FIG. 4 is a schematic view of an apparatus for producing an optical fiber preform according to an embodiment of the present invention, wherein a substrate tube is supported.

FIG. 3 is a schematic view of an apparatus for producing an optical fiber preform according to an embodiment of the present invention and FIG. 4 is a schematic view of an apparatus for producing an optical fiber preform according to an embodiment of the present invention, wherein a substrate tube is supported.

As shown in FIG. 3, the apparatus for producing an optical fiber preform according to the present invention comprises a main heat source 500 disposed on a horizontal lathe for applying heat to a substrate tube, a main heat source location detecting sensor 800 fixed on a side of the horizontal lathe or disposed at a predetermined distance from the horizontal lathe for detecting the location of the main heat source, an additional supporting device 1100 disposed on the horizontal lathe for supporting the substrate tube, and an additional supporting device control part 1000 disposed outside the horizontal lathe for wiredly or wirelessly receiving a location signal from the main heat source location sensor 800 and controlling the additional supporting device in response to the received location signal. Here, the additional supporting device 1100 functions to wiredly or wirelessly receive a control signal from the additional supporting device control part 1000 to be moved to a predetermined supporting location in response to the received control signal.

As shown in FIG. 4, the additional supporting device 1100 comprises a substrate tube additionally supporting part 1400 for additionally supporting the substrate tube 100, a vertical transport means having the substrate tube additional supporting part 1400 attached thereto to transport the substrate tube additionally supporting part 1400 perpendicularly to the axial direction of the substrate tube 100 in response to a control signal transmitted thereto from the additionally supporting device control part 1000, and a horizontal transport means having the vertical transport means attached thereto to transport the vertical transport means to the axial direction of the substrate tube 100 in response to a control signal transmitted thereto from the additional supporting device control part 1000.

The substrate tube additionally supporting part 1400 comprises a pair of rolls 1200 for supporting the substrate tube 100 in such a manner as to be in contact with the substrate tube 100 and a roll supporting part 1300 on which the rolls 1200 are mounted. Here, the roll supporting part 1300 is attached to a rotating arm 1500, whereby it may rotate within a predetermined angle range.

In an embodiment according to the present invention, the vertical transport means is realized by a pneumatic cylinder 1700, though various means having the same function as the pneumatic cylinder may be employed.

The pneumatic cylinder 1700 is wiredly or wirelessly connected to the additional supporting device control part 1000 for receiving an electrical control signal therefrom and lifting up a piston 1600 in response to the received control signal to actuate the rotating arm 1500 mounted to an end of the piston 1600 with a rotative joint.

The horizontal transport means comprises a transport stand 1900 having a pinion shaft 2400 fastened to a drive shaft 2200 and a pinion 2300 mounted on the pinion shaft 2400, and a guide 1800 disposed on a horizontal lathe 400 to be engaged with the pinion 2300 and having a rack formed thereon. Here, the drive shaft 2200 drives the pinion 2300.

In a preferred embodiment according to the present invention, the horizontal transport means further comprises a drive means.

The drive means includes a rotation controllable motor wiredly or wirelessly connected to the additional supporting device control part 1000. The motor may be preferably realized by a constant speed motor 2000, a precisely controllable servo motor or a stepping motor, though any other motors having the same function as them may be employed.

The additional supporting device control part 1000 is wiredly or wirelessly connected to a supporting location control sensor 900 and comprises a first input part for receiving a signal indicative of location of the main heat source 500 from the main heat source location detecting sensor 800, a second input part for receiving a signal indicative of the additional supporting device 1100 reaching the supporting location from the supporting location control sensor 900, a microprocessor for controlling the operation of the motor and pneumatic cylinder 1700 installed in the additional supporting device 1100 and an output part for outputting an operation control signal generated from the microprocessor. Here, the supporting location control sensor 900 is fixed at the supporting location predetermined on the horizontal lathe or located at a predetermined distance from the horizontal lathe. It also detects the location of the additional supporting device 1100 when the additional supporting device 1100 reaches the predetermined supporting location and transmits a location signal to the second input part.

The microprocessor makes the additional supporting device 1100 support the substrate tube 100 only for a predetermined period of time until the temperature of substrate tube reaches the target value after the main heat source 500 starts heating the substrate tube.

The additional supporting device 1100 according to the present invention reduces the effective length of the substrate tube 100 among factors which most affect the deformation of the substrate tube 100, including the effective length, which means a distance between supported points of the substrate tube 100, the shape of the substrate tube 100, the time during which the substrate tube is exposed to the heat source, and the like. Therefore, the deflection at a portion where the initial part has a low viscosity and the effect of shear force is great can be considerably reduced. Theoretically, when a beam is under its own weight, the deformation generated at an end of the beam is in proportion to 4th power of the length of the beam and hence, the additional supporting device according to the present invention can reduce 4th power of the length reduction.

Now, the operation of the apparatus for producing an optical fiber preform according to the present invention having the foregoing construction will be described in detail hereafter with reference to FIGS. 4 and 5.

Figure 5:
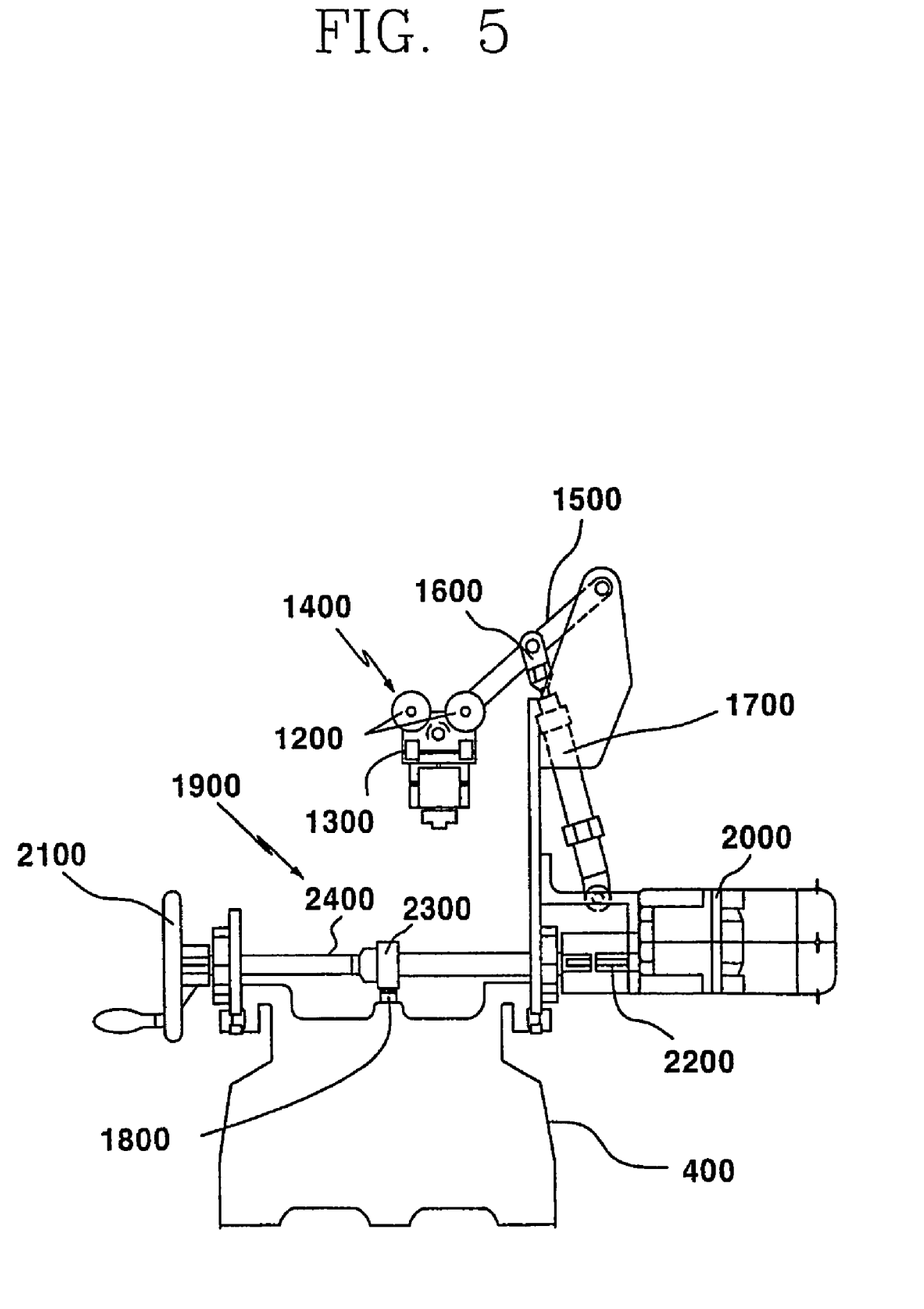
FIG. 5 is a schematic view of an apparatus for producing an optical fiber preform according to an embodiment of the present invention, wherein a piston of an additional supporting device descends.

As shown in FIGS. 4 and 5, when the first input part receives a location signal of the main heat source 500, the microprocessor drives the constant speed motor 2000 to transport the additional supporting device 1100. When the second input part receives the signal indicative of the additional supporting device reaching the supporting location from the supporting location control sensor 900, the microprocessor stops the transport of the additional supporting device 1100 and controls to lift up the piston 1600 of the pneumatic cylinder 1700. As the piston 1600 is raised, the rotating arm 1500 is actuated and consequently, the substrate tube additionally supporting part 1400 is raised to additionally support the substrate tube 100

In a modified embodiment of the present invention, the additional supporting device 1100 may be moved manually by rotating a rotator 2100 connected to the pinion axis 2400 as shown in FIG. 4 and FIG. 5, instead of using a constant speed motor.

Now, the method for producing an optical fiber preform according to the present invention will be described in detail hereinafter with reference to FIGS. 6 and 7.

Figure 6:
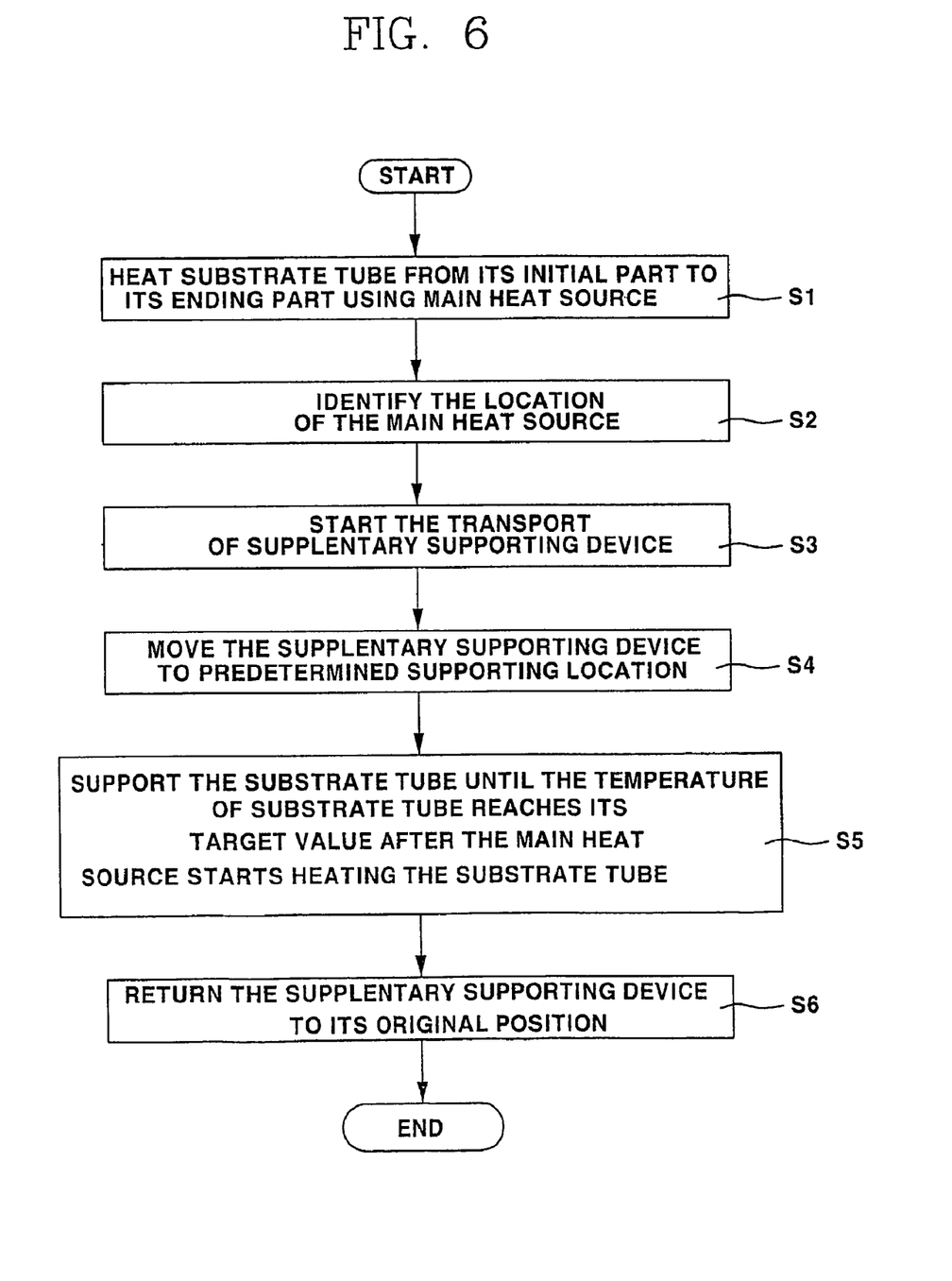
FIG. 6 is a flow chart illustrating the operation of a main heat source and an additional supporting device according to a first embodiment of the method for producing an optical fiber preform of the present invention.

FIG. 6 is a flow chart illustrating the operation of a main heat source and an additional supporting device according to a first embodiment of the method for producing an optical fiber preform of the present invention.

First, the main heat source 500 heats the substrate tube 100 from the initial part where the heating is initiated to the ending part where the heating is ended (S1). After an elapse of a prescribed time, the substrate tube 100 comes to have uniform heat flux. When the temperature of the tube exceeds a predetermined limit, the tube begins to deflect at the heating point. At this time, the main heat location detecting sensor 800 disposed at the initial part of the substrate tube 100 identifies the location of the main heat source (S2). Then, the main heat location detecting sensor 800 transmits a location signal to the additional supporting device control part 1000, which in turn controls to start the transport of the additional supporting device 1100 (S3). Thus, the additional supporting device 1100 is moved to a predetermined supporting location (S4).

Then, the additional supporting device supports the substrate tube 100 until the temperature of substrate tube reaches the target value after the main heat source 500 starts heating the substrate tube 100 by means of a timer (S5) and returns to its original position (S6).

Therefore, the method for producing an optical fiber preform according to the present invention makes it possible to produce an optical fiber preform with a minimized deflection of the initial part.

Figure 7:
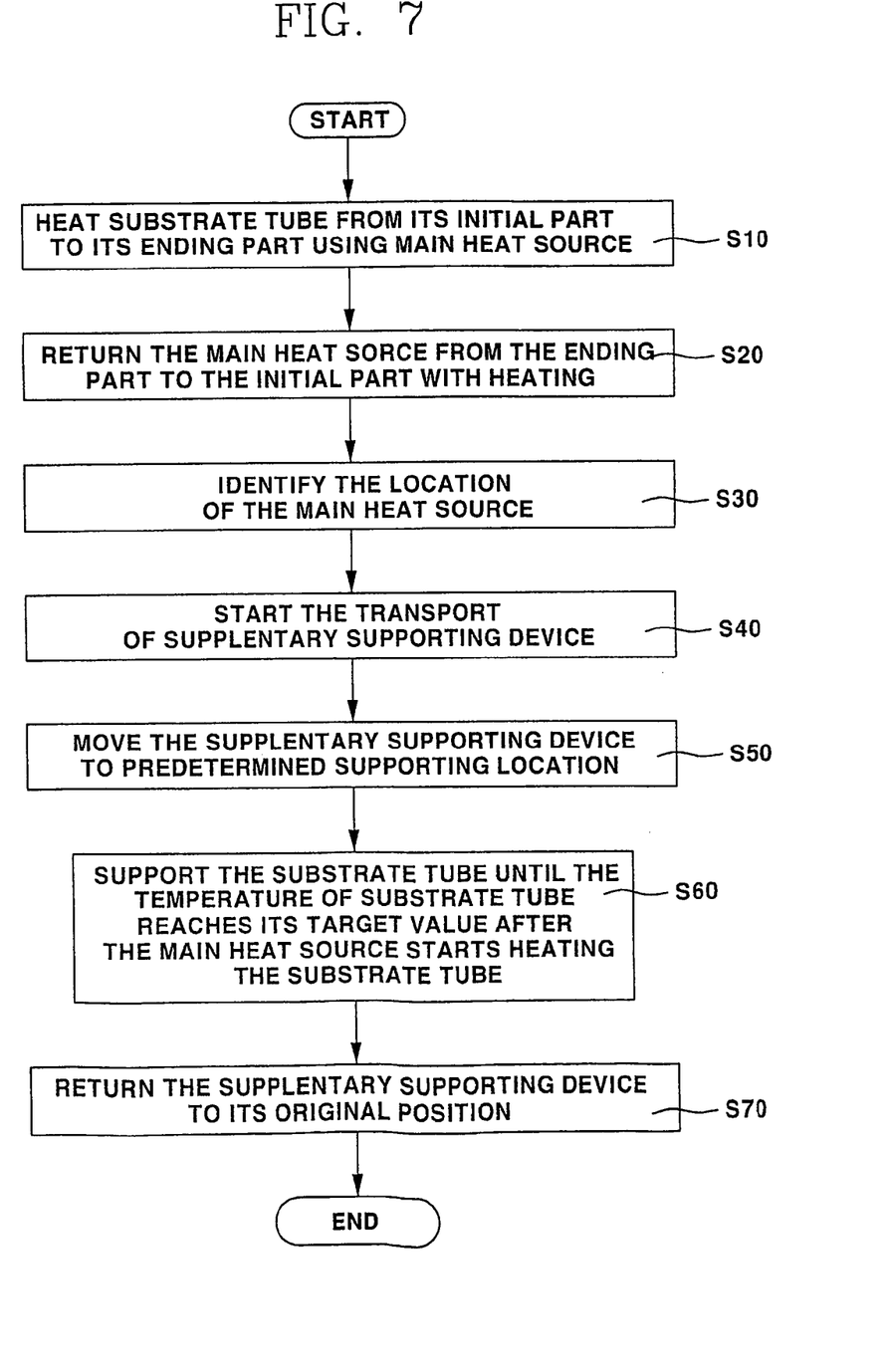
FIG. 7 is a flow chart illustrating the operation of a main heat source and an additional supporting device according to a second embodiment of the method for producing an optical fiber preform of the present invention.

Meanwhile, an optical fiber preform can be produced according to procedures as shown in FIG. 7 according to the operation mode of the main heat source.

FIG. 7 is a flow chart illustrating the operation of a main heat source and a additional supporting device according to a second embodiment of the method for producing an optical fiber preform of the present invention, which further comprises a step of allowing the main heat source to heat the substrate tube between the step (S1) and the step (S2). Thus, the method for producing an optical fiber preform according to the second embodiment is carried out as follows. The main heat source 500 heats the substrate tube 100 from the initial part where the beating is initiated and the ending part where the heating is ended (S10). Thereafter, the main heat source 500 returns from the ending part to the initial part with heating (S20). The main heat location detecting sensor 800 mounted on the horizontal late at the initial part of the substrate tube 100 then identifies the location of the main heat source 500 (S30). Then, when the additional supporting device control part 1000 receives a location signal of the main heat source 500 from the main heat location detecting sensor 800, it starts the additional supporting device 1100 (S40). Next, when the additional supporting device control part 1000 receives a location signal of the additional supporting device from the supporting location control sensor 900, it allows the additional supporting device 1100 to be moved to a predetermined supporting location in response to the received locations signal (S50).

Once the additional supporting device 1100 is moved to the supporting location where the supporting location control sensor 900 is disposed, it supports the substrate tube 100 until the temperature of substrate tube reaches the target value after the main heat source 500 starts heating the substrate tube 100 by means of a timer (S60) and, after an elapse of a prescribed time, returns to its original position (S70). Again, the main heat source 500 heats the substrate tube 100 while moving from the initial part to the ending part (S10) and returns from the ending part to the initial part (S20), after which the forgoing procedures are performed repeatedly.

Here, the supporting location is determined in consideration the standard of the substrate tube 100, deposition time or viscosity.

Therefore, the method for producing an optical fiber preform according to the present invention makes it possible to produce an optical fiber preform without deflection of the initial part.

INDUSTRIAL APPLICABILITY

The apparatus for producing an optical fiber preform and the method for producing an optical fiber preform using the same according to the present invention reduce the effective length of the substrate tube 100 by additionally supporting the substrate tube 100, thereby minimizing the deflection of the substrate tube 100. Particularly, it is possible to considerably reduce the deflection of the substrate tube at its initial part and thus to achieve a high deposition efficiency. Accordingly, it is possible to mass-produce an optical fiber preform of high quality.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The invention claimed is:

1. An apparatus for producing an optical fiber preform using MCVD (Modified Chemical Vapor Deposition) that deposits deposition compositions on an inner surface of a substrate tube by heating an outer surface of the substrate tube supported by a horizontal lathe with the use of a main heat source moving along the horizontal lathe, the apparatus comprising:

an additional supporting device including a substrate tube additionally supporting part for supporting the substrate tube in a load direction in contact with the substrate tube, a vertical transport member for transporting the substrate tube additionally supporting part perpendicularly to an axial direction of the substrate tube, and a horizontal transport member for transporting the vertical transport member to the axial direction;

a main heat source location detecting sensor for detecting a location of the main heat source;

a supporting location control sensor for detecting a location of the additional supporting device when the additional supporting device reaches a predetermined supporting location of the axial direction; and an additional supporting device control part for receiving a signal indicative of the location of the main heat source from the main heat source location detecting sensor and then moving the additional supporting device using the horizontal transport member, the additional supporting device control part controlling the vertical transport member to raise the substrate tube additionally supporting part perpendicularly to the axial direction and thus support the substrate tube.

2. The apparatus producing an optical fiber preform according to claim 1, wherein the substrate tube additionally supporting part includes;

a pair of rolls for supporting the substrate tube in contact with the substrate tube; and a roll supporting part on which the rolls are mounted.

3. The apparatus producing an optical fiber preform according to claim 2, wherein the vertical transport member includes;

a rotating arm connected to the substrate tube additionally supporting part;

a piston hinged arm connected to the substrate tube additionally supporting part;

a pneumatic cylinder for wiredly or wirelessly receiving an electric control signal from the additional supporting device control part and lifting up the piston.

4. The apparatus for producing an optical fiber preform according to claim 2, wherein the horizontal transport member includes;

a constant speed motor whose rotation is controlled by the additional supporting device control part;

a pinion connected to the constant speed motor; and a rack engaged with the pinion.

* * * * *